United States Patent [19]

Goudjil

[11] Patent Number: 5,581,090
[45] Date of Patent: Dec. 3, 1996

[54] PHOTOCHROMIC ULTRAVIOLET DETECTOR

[75] Inventor: Kamal Goudjil, Boulder, Colo.

[73] Assignee: Solartech Enterprises, LLC, Boulder, Colo.

[21] Appl. No.: 547,994

[22] Filed: Oct. 25, 1995

[51] Int. Cl.$^6$ ............................................. G01J 5/48
[52] U.S. Cl. ............................ 250/474.1; 250/372
[58] Field of Search .................... 250/474.1, 372 EM; 544/71

[56] References Cited

U.S. PATENT DOCUMENTS

| | | | |
|---|---|---|---|
| 3,449,572 | 6/1969 | Sylvester | 250/474.1 |
| 4,719,296 | 1/1988 | Irie et al. | 544/71 |
| 4,818,491 | 4/1989 | Fariss | 250/372 EM |
| 4,863,282 | 9/1989 | Rickson | 250/474.1 |
| 5,028,792 | 7/1991 | Mullis | 250/474.1 |
| 5,238,981 | 8/1993 | Knowles | 524/110 |
| 5,296,275 | 3/1994 | Goman et al. | 250/474.1 |
| 5,387,798 | 2/1995 | Funakoshi et al. | 250/474.1 |

FOREIGN PATENT DOCUMENTS

| 0077628 | 3/1990 | Japan | 250/474.1 |
|---|---|---|---|

OTHER PUBLICATIONS

D. S. Berger, Photochem. Photobiol. 24, 587, 1974 no month.
B. K. Dichter, Journal of Machine Perception, vol. 10, n4 19, 1993 no month.

*Primary Examiner*—David P. Porta
*Assistant Examiner*—Richard Hanig

[57] ABSTRACT

An Ultraviolet detector based on the propriety of a photochromic composition in changing its color upon exposure to UV rays is described. The said photochromic composition contains a spiropyran or a spiroxazine molecule previously dissolved in a non-polar solvent such as toluene, cyclohexane, then mixed to clear plastics to be incorporated in any item e.g. watch, credit card, sunscreen bottle cap. The present UV sensor can also be used as a sun shading technique on a windshield of an automotive vehicle.

4 Claims, 5 Drawing Sheets

Fig. 1

Colorless            Colored

PHOTOCHROMIC ULTRAVIOLET DETECTOR

BACKGROUND OF THE INVENTION

The present invention relates to a UV detector which does not necessitate any electrical input. Specifically this UV detector is based on a photochromic material which changes color when exposed to UV radiation indicating in this way the presence of Ultraviolet radiation.

The sun which is fundamental for the existence of life form on planet Earth, emits in a large spectrum of wavelengths. This includes ultraviolet. Despite the undeniable importance of cutaneous exposure to ultraviolet radiation for vitamin D production, there is evidence that the skin is damaged in many different ways by its exposure to natural or artificial sunlight.

The ultraviolet spectrum is divided into three bands termed as UVA, UVB and UVC. The wavelength regions are defined by Environmental photobiologists as: UVA [320–400 nm], UVB [290–320 nm] and UVC [200–290 nm]. The division between UVB and UVC has been chosen to be at 290 nm since this limit represent the Ozone cutoff. Ultraviolet radiation that reaches the Earth's surface are UVA and UVB. UVA radiation is 1000-fold less effective than UVB in producing skin redness. However, its predominance in the total solar spectrum is 100-fold more than UVB. Therefore, UVA plays a more important role in contributing to harmful effects of sun exposure then previously suspected.

I. Atmospheric Ozone The amount of ultraviolet radiation reaching the Earth's surface depend on the energy output of the sun and the transmission proprieties of the Atmosphere. The quantity of UV radiation reaching the surface of our planet is largely governed by a thin layer of Ozone molecules (3 mm at standard temperature and Pressure). The Ozone $O_3$ is created by dissociation of oxygen molecule $O_2$ by short wavelength ($\lambda 242$ nm) in the region of the atmosphere called the Stratosphere. The recombination of the oxygen Atom and the molecular oxygen, in the presence of a catalyst molecule and absence of ultraviolet, is the phenomenon responsible of ozone formation. On the other hand, the dissociation of $O_3$ by UV wavelength up to 320nm is the mechanism preventing radiation at wavelength less than about 290 nm from reaching the Earth's surface. This cycle of formation-dissociation of the ozone molecule is a very important process in maintaining life on Earth. In 1974, Molina and Rowland (Nobel prize of Chemistry 1995) first warned that chlorofluorocarbons CFCs and other gases released in the atmosphere by human activities could alter the natural balance of creative and destructive processes and lead to depletion of the stratospheric Ozone layer (Nature 249, 810). Reductions of up to 50% in the ozone column over Antarctica have been observed and first reported in 1985 by Farman and collaborators (Nature 315, 207). In addition, a significant decrease in total ozone over the northern hemisphere of about 2 to 3% per decade for the past 30 years has been reported by Frederick (Photochem. Photobiol. 51,757, 1990). Recent satellite measurements indicate a worldwide decrease in stratospheric ozone over the last decade.

II. Ultraviolet Intensity Variation

The spectral irradiance of UVR depends on the time of the day, the season, the geographical location, and multiple meteorological factors (Diffey, Phys. in Med. and Biol. 36(3), 299, 1991):

- Time of the day: 75% of the total UV radiation is received in mid-day, between 10AM and 3PM.
- Season: There is an undeniable seasonal dependence of UV radiation that reaches the earth surface. There is more Ultraviolet rays in summer than in winter. However, this seasonal variation is much less apparent near the equator.
- Geographical Latitude: Annual UVR flux decreases with increasing distance from the equator.
- Clouds: clouds have a minimal effect on intensity of ultraviolet radiation although they reduce the total solar irradiance at the earth's surface. However, very heavy storm clouds can eliminate terrestrial ultraviolet.
- Surface reflection: Reflection of UVR from ground surfaces is normally low although the reflectance of fresh snow exceeds 80%.
- Altitude: In general there is an increase of about 6% of UV flux each 1 km increase in Altitude.

III. Effects of Ultraviolet Radiation on Living Organisms
The biological effects that result from ultraviolet radiation are initiated by photochemical absorption by biological molecules. The most important is the DNA deoxyribonucleic acid. The absorption spectrum of the DNA molecule, where the chromophores (absorbing centers) are the nucleotide bases, presents a maximum between 260–265 nm with a rapid decrease at longer wavelengths. This characteristic is useful as a way to get rid of unwanted viruses. Aquatic life is also affected by ultraviolet radiation. The organisms that live in either fresh water or oceans derive their energy from sunlight. Among them is the well known in the food chain Phytoplankton. Solar UV can penetrate to significant depths in water. Damaging effects of Solar UVB on phytoplankton will occur at depths in excess of 20 m in clear waters and 5 m in cloudy waters. It has been estimated that a reduction of 25% in the ozone layer would result in enhanced UVB levels at oceans that would lead to a decrease of 35% of phytoplankton photosynthesis (Smith et al, Photochem. Photobiol. 31,585, 1980). It is, also, believed that the increasing intensity of UV radiation could be responsible for the extinction of frogs. This can be explained by the sensitivity of their skin to their living environment.

The responses of plants to UV irradiation include the reduction of leaf size and limitation of the area available for energy capture. These results have been achieved through studies in greenhouses exposed to artificial sources of UV radiation (Tevini and Teramura Photochem. Photobiol. 50, 479, 1989).

IV. Effects of Ultraviolet Radiation on Humans

While a small amount of exposure to sunlight can be healthy, by inducing the synthesis of vitamin D, too much can be dangerous. Exposure to UV rays is linked to a number of harmful health effects.

1. Sunburn

Sunburn or erythema can be initiated upon excessive exposure to solar UVR. The resulting redness of the skin is due to an increased blood content in the superficial blood vessels in the dermis. Although it has been observed that UVA radiation is much less erythmogenic than UVB radiation (by a factor of 1000) the much higher UVA irradiance present in sunlight contributes about 20% to the sunburn (McKinley and Diffey 1987 in Human exposure to UV radiation: Risks and regulations, Elsevier, Amsterdam, pp83–87).

Of course, the skin color is an important factor in determining the ease with which the skin will sunburn. Fair-skinned people require only about 15–30 min. of midday summer sunshine to induce an erythemal reaction. People with moderately pigmented skin may require 1 to 2 hours exposure and those with darkly pigmented skin will not normally sunburn. Individuals can be grouped in six sun sensitive skin types as it is shown in the table below (Diffey, Phys. in Med. and Biol. 36(3), 299, 1991).

| Skin type | Skin reactions to solar radiation | Examples |
| --- | --- | --- |
| 1 | Always burns easily and severely; tans little or none and peels | People most often with fair skin, blue eyes, freckles, unexposed skin is white |
| 2 | Usually burns easily and severely; tans minimally or lightly, peels | People most often with fair skin, red or bond hair, blue, hazel or even brown eyes, unexposed skin is white |
| 3 | Burns moderately and tans about average | Normal average Caucasian, unexposed skin is white |
| 4 | Burns minimally, tans easily and above average, exhibits immediate pigment darkening (IPD) reaction | People with white or light brown skin, dark brown hair, dark eyes, unexposed skin is white or light brown |
| 5 | Rarely burns, tans easily and substantially always exhibits IPD reaction | Brown-skinned persons (Hispanics, East Indians, etc.), unexposed skin is brown |
| 6 | Never burns exhibits IPD reaction | People with black skin (Black African etc.), unexposed skin is black |

2. Photo-aging

The signs of photo-aged skins are dryness, deep wrinkles, accentuated skin furrows, loss of elasticity and mottled pigmentation. It has been speculated that perhaps as much as 80% of solar-UV induced aging, occurs within the first 20 years of life. The relative importance of different wavelengths in aging can not be determined. However, some experiments have been performed on mice which showed that both UVA and UVB radiation are responsible in histological, physical, and visible changes characteristic of photo-aging. The application of sunscreens has been shown to inhibit photo-aging in mice chronically exposed to solar radiation. Maximum photo protection is afforded by chemical sunscreens with SPF ratings of 15 or higher. Although most sunscreens on the market today are appropriate for UVB protection, combination sunscreens that are effective against UVA and UVB are preferable.

3. Skin Cancer

Skin cancer is the most common human cancer. There is an undoubtable link between the occurrence of this cancer and the amount of exposure to UV radiation. It has been shown that Caucasians are much more likely to develop non-melanoma skin cancer NMSC. The action spectrum for the induction of melanoma by UVR is unknown, although UVB is considered by some scientists (Koh et al, Photochem. Photobiol. 51, 756, 1990) to be the waveband primarily responsible. The possibility that the action spectrum lies within UVA, visible or infrared cannot yet, be discarded.

4. Effects of solar ultraviolet radiation on the eye

Recent epidemiological studies have shown that UVB is the most damaging part of the ultraviolet spectrum for the eye. Studies in experimental animals have confirmed that the development of certain type of cataract (opacity of the lens) are associated with ocular UVB exposure. Similar results have been found in humans.

V. Monitoring Ultraviolet Radiation (Prior Art)

In order to better quantify and understand the UV problem, new monitoring programs are being put into place throughout the world. Because ultraviolet levels are dependent on local air pollution conditions, it is clear not only that many monitoring sites are needed but that the monitoring must be carried out continuously over a long period of time.

A class of detectors called broadband instruments is used to extend UV monitoring to many sites and to all atmospheric conditions. The technology used in these sensors is based on fluorescent phosphors. The primary difficulty in measuring solar UV lies in the fact that less than 1% of the total energy of sun light is in this spectral region. The measurement background, in this case visible light, is many order of magnitude greater than the signal. Fluorescent phosphor $MgWO_4$ (Magnesium Tungstate) based sensors utilize the combination of colored glass filters and the excitation-emission properties of the phosphor (D. S. Berger, Photochem. Photobiol. 24, 587, 1974 and D. Robertson, 1972, Ph.D. Thesis University of Queensland, Australia), See sales catalogue of Solar Light Co., Philadelphia, Pa. and Yankee Environmental Systems, Inc., Turners Falls, Mass. The instrument is composed of a UV transmitting weather dome, a black-glass UV pass filter, a fluorescent phosphor, and a photodiode. The UV radiation striking the Magnesium Tungstate phosphor is converted to visible light (green) which in turn is detected by a photodiode. The resulting photodiode current is proportional to the amount of UV light. A variety of phosphors and UV transmitters can be used to detect different spectral regions of ultraviolet light. Another sensor, used in meteorological applications to measure UVA, uses a Schott glass filter and $BaMg_2Al_{16}O_{27}:Eu$ phosphor (B. K. Dichter, Journal of Machine Perception, v10 n4, 19, 1993).

SUMMARY OF THE INVENTION

As it has been described earlier phosphor based sensors require, in addition to a couple of optical filters, an electric input in order to amplify the electronic signal generated by the photodiode. Their prices range from $1000 to $5000. It is therefore clear that these kind of UV detectors are not designed for the general public use. Their utilization is confined to environmental UV monitoring and to laboratory UV measurements.

Due to the increase of the public awareness regarding health issues related to UV radiation, especially in the southern hemisphere (Australia, New Zealand. . .), we developed a very light weight, inexpensive UV sensor which does not require any electrical energy input. Our UV detector can be incorporated in any item e.g., watches, pins, buttons, stickers, sports wear, telephone cards, credit cards. The present sensor is based on a photochromic chemical which can absorb ultraviolet radiation between 280 nm and 400 nm and emits in the visible region of the spectrum: red, violet, blue. The originality of the present sensor is its ability to deliver a discernible amount of visible light under sunlight without the aid of any filter, photodiode, or any kind of electronic amplifying circuit. Although such type of sensor has been invented by Funakoshi et al under the appellation UVA, UVB discrimination sensor (U.S. Pat. No. 5387798), the present sensor presents, however, the interesting characteristic in going back to the colorless form in less time than required by other type of sensors using the same photochromic compound. Moreover, in contrary to the UV discrimination sensor described in the U.S. Pat. No. 5387798, the present UV detector displays a color change in a multitude of intense colors: red, violet, blue, green. In addition, as it will be described later in the embodiments, the present UV sensor is presented in new attractive designs. The inventions of Mullis, U.S. Pat. No. 5028792 and Goman et al, U.S. Pat. No. 5296275 assigned to Xytronix, Inc. describe a UV sensitive systems where a dye consisting of a nitro-substituted aromatic aldehyde is used. These kind of sensors are not color fast, the time required for color change is greater than 15 min.

The chemical used in our detector is a photochromic compound exhibiting a change of color upon exposure to UV radiation (e.g., solar UV). Photochromic compounds and their molecular transformation have attracted the interest of photochemists for many years. An extensive review of the properties and applications of such compound has been given in the book Photochromism, molecules and systems (H. Durr and H. BouasLaurent, Ed. 1990), Elsevier publishers, Amsterdam. The interest in these compounds is strongly focused on their intriguing potential as materials for data storage and as light filters particularly in the manufacturing of ophthalmic lenses and sunglasses.

Nonetheless, the mechanism of their transformations also continue to provide interesting problems in basic scientific research.

Figure 1:
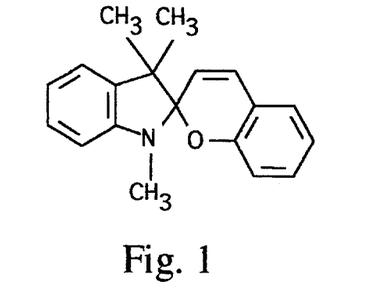
Figure 2:
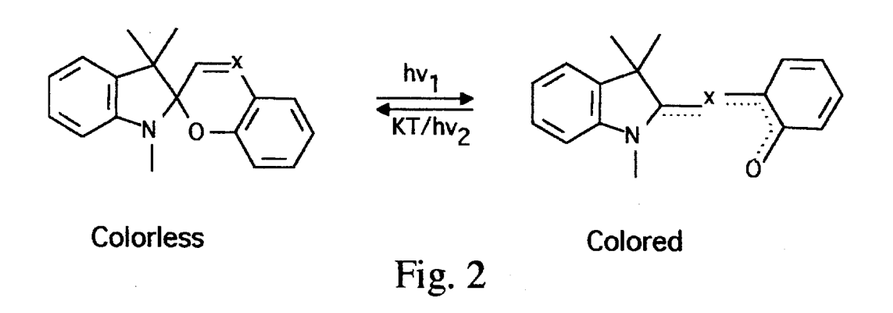
FIG. 2 shows the structures of colorless spiropyran (SP) or spirooxazine (SO) and colored merocyanine (MC). $hv_1$ is the energy of the ultraviolet incident photon, $hv_2$ and KT indicate the processes, respectively visible light and heat, by which the fading rate can be accelerated.
Figure 3:
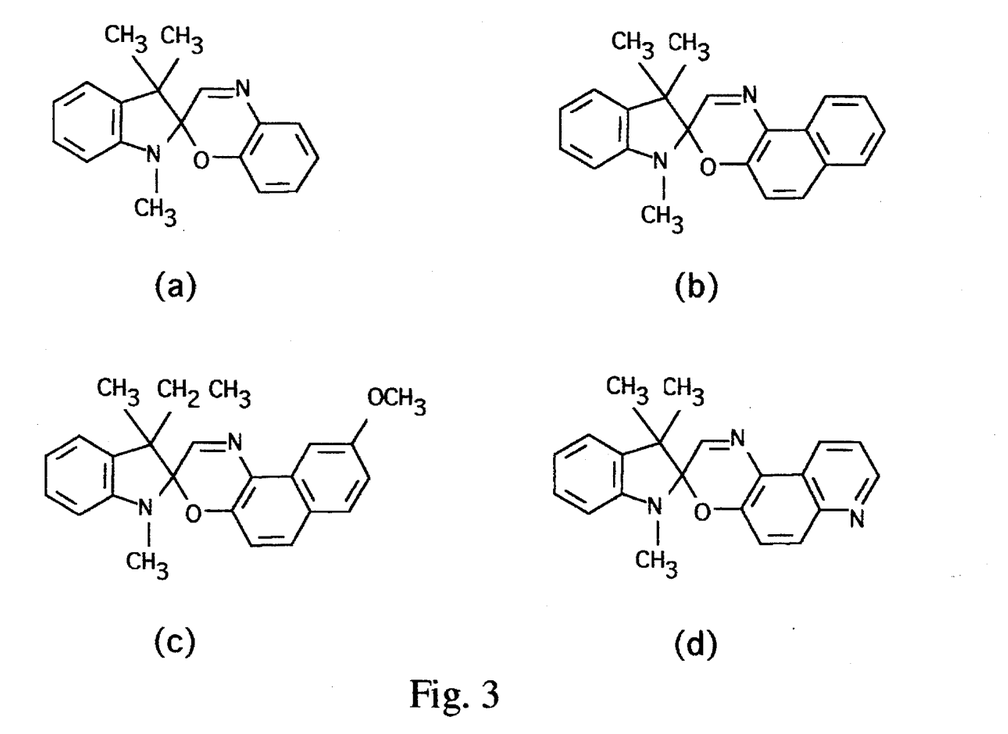
FIG. 3 shows the structure of 4 spirooxazines. Their IUPAC organic nomenclature are.

Among the large family of photochromics figure the family of compound called Spiropyrans with the general formula: trimethylindolinospirobenzopyran (FIG. 1). The spiropyran appears as a colorless compound which undergoes a photochemical transformation under UV radiation to an intensely colored open chain merocyanine (FIG. 2). However, despite their interesting feature in changing color under UV light, the spiropyran group present a drawback. These Photochemical compounds have a short lifetime, therefore, they are not very useful in real life applications. In comparison to other photochromic compounds, some spirooxazines have an excellent light fatigue resistance. A moderate durability of 2 to 3 years has become a reality (N.Y. Chu, Photochromism: molecules and systems, 1990). The fatigue resistance of SO photochromic lens is reported to be significantly increased by the incorporation of organonickel complexes or by the use of a hindred amine light stabilizer (HALS), see for example, U.S. Pat. No. 4720356 and U.S. Pat. No. 5391327.

1. Chemical structure of spirooxazines

The chemical structure of spirooxazine is closely related to the spiropyran group. The only difference in the chemical structure between spiropyran and spirooxazine is that the $C=C$ bond in the pyran ring is replaced by a $C=N$ bond in the case of oxazine (FIG. 2) (N. Y. Chu, 1986, Eur. Pat. Appl. 195898 A1 to American Optical).

2. Chemical and physical characteristics of spirooxazines

Figure 4A:
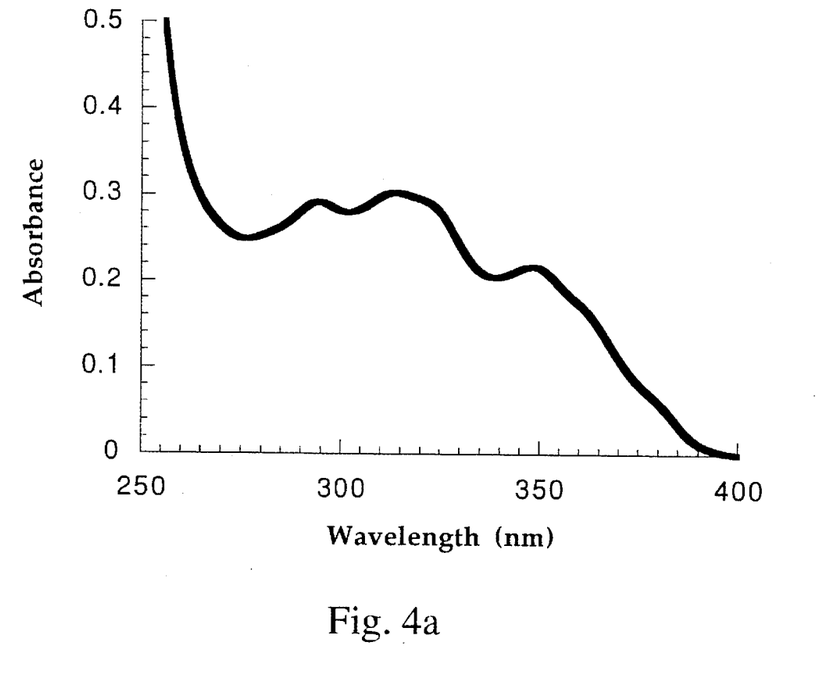
FIG. 4 shows the Absorption spectrum of (a) the closed form SO 1',3',3'-trimethylspiro[indoline-2',3'-[3H]naphth[2,1-b][1,4]oxazine ] in ethanol and (b) open form MC at 30 deg. C.
Figure 4B:
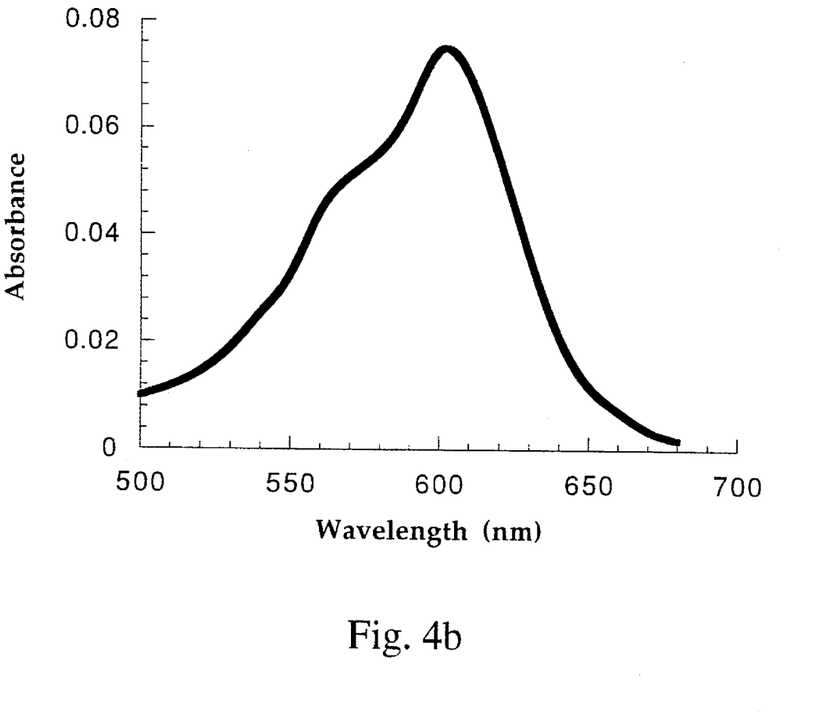

Spirooxazines are pale yellow powders and are colorless in solution (see for example U.S. Pat. No. 4913544). The solubility of spirooxazines (SO) is low in alcohols and aliphatic hydrocarbons, high in aromatic hydrocarbons and intermediate in ketones and halogenated hydrocarbons (N.Y. Chu, in Photochromism: molecules and systems, 1990). The solution of spirooxazine shows a better coloration in polar solvent (Ethanol, Acetone . . .) than in non-polar solvents (Toluene, Cyclohexane . . .). Spirooxazines can also be incorporated in a polymer matrix (e.g. polymethylmethacrylate, polyvinylalcohol. . .). The Photomerocyanine formed upon the exposure of the spirooxazines to UV radiation shows a coloration (red, blue . . .). This, because the first electronic transition of such merocyanine molecule occurs in the visible region of the light spectrum (FIG. 4). The coloration, red, blue, violet . . ., is dependent upon the substituent incorporated in the spiroxazine molecule.

Figure 5:
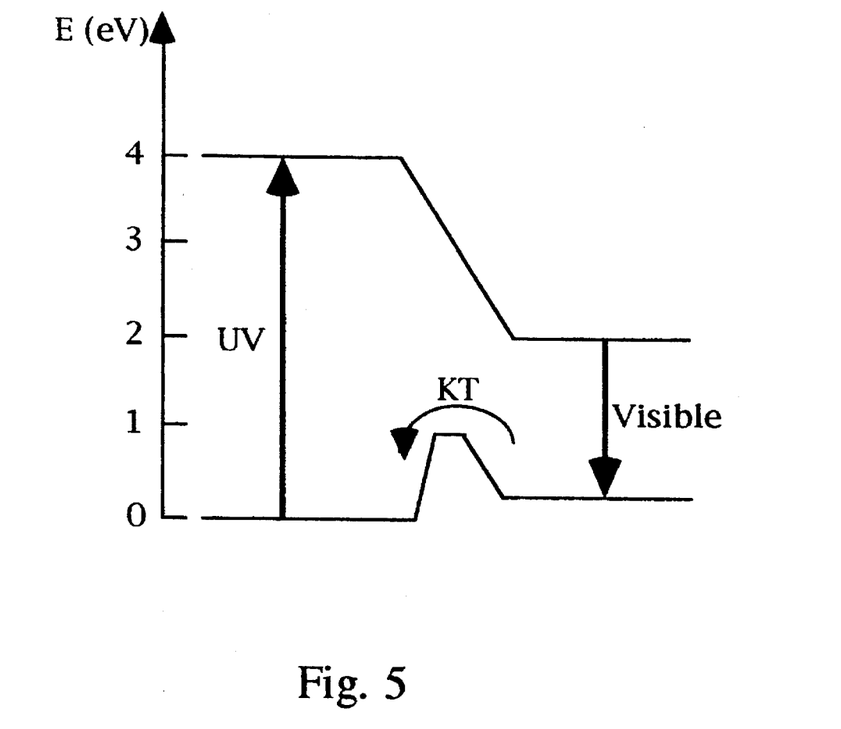
FIG. 5 is the molecular state correlation diagram showing the energy barrier between the ground state of the open form (MC) and the ground state of the closed form (SO). The different energy levels have been positioned according to experimental and theoretical data extracted from various scientific publications.

The photomerocyanines bleach back to the colorless closed form by thermal or photolitic processes. The activation energy, for the merocyanine of the parent NISO, for bleaching is 19.7 Kcal/mol. (1 eV=23.02 Kcal/mol.) (N.Y. Chu, SPIE's 291h Annual International Technology Symposium Optical and Electrooptical Engineering, 562, 1985). The energy difference between the ground states of the colorless and colored forms of the parent spirooxazine is only 4.2 Kcal/mol. (FIG. 5)

It has been shown that the photomerocyanine absorption spectrum exhibits a red shift (a positive solvatochromism) when the photoactivated parent spirooxazine is dissolved first in toluene then in methanol. As the polarity of the solvent decreases, a hypsochromic shift of the absorption band is observed. For example, the absorption maximum at 612 nm of SO in ethanol is shifted to 590 nm in toluene and to 555 nm in cyclohexane. Polar solvents such as ethanol and acetone promote the formation of the colored form. The colored form generated by irradiation with UV light decays thermally to the colorless form at ambient temperature. The rate of thermal decay is governed by the height of the energy barrier existing between the open form (merocyanine) and the closed form (spirooxazine). The activation energy is very dependent on the substituent in the oxazine part of the photochromic molecule as well as on the solvent polarity (N. Y. Chu, Photochromism: Molecules and Systems, 1990). Furthermore, It has been observed that the rate of color decay depends on the concentration of the photochromic molecule present in the solution. A substantial increase of the rate of color decay was observed with decrease of the photochrome concentration. The fading rate obeyed an exponential decay.

Hence, one way of increasing the fading rate is by reducing the concentration. However, this will reduce drastically the intensity of the color change. Therefore, it is clear that a non-polar solvent is most suitable to dissolve the photochromic compound since our goal is to reduce the time latency of the fading without diminishing the intensity of visible color. Indeed, by the incorporation of a non-polar solvent such as toluene or cyclohexane into the spiroxazine derivative one may observe that the fading rate has increased compared to the fading rate in the case of polar solvents such as ketones and alcohols. This feature has two incident properties: one is that the time for recovery to the colorless form is reduced and this can be useful when the photochromic is used as a light shading technique for automobile windshield. Indeed, the use of a photochromic compound in windshield of a car necessitates a fast response since the sunlight reaching the vehicle is constantly varying in intensity. This is most critical when the vehicle enters a tunnel for example. The fading rate should, therefore, be fast enough to restore the full illumination for the driver. The second advantage in increasing the speed of the recovery process is in the increase of the lifetime of the photochromic compound. Indeed, it is well known that the destruction of the spirooxazine or spiropyran is essentially due to the oxidizing oxygen inhibiting the merocyanine to return to the closed colorless form. A study has shown that the photochromic phenomenon is not indefinitely reversible, as oxidative degradation processes, slowly convert the spirooxazines to products devoid of photochromic activity (V. Malatesta et A1, J. Org. Chem. 1995, 60, 5446). Thus, by reducing the lifetime of the merocyanine one may gain in the overall lifetime of the photochromic compound.

BRIEF DESCRIPTION OF THE DRAWINGS

FIG. 1 shows the chemical structure of a typical spiropyran:

1',3', 3'-trimethylspiro[2H-1-benzopyran-2,2'-indoline]

(a) 1',3', 3'-trimethylspiro[2H-1,4-benzoxazine-2,2'-indoline], called BISO (b) 1', 3',3'-trimethylspiro[indoline-2',3'-[3 H]naphth[2,1 -b][1,4]oxazine]

(c) 3-ethyl-9'-methoxy-1,3-dimethylspiro[indoline-2,3'-[3 H]naphth-[2,1 -b][1,4]oxazine], called NISO (d) 1,3,3-trimethylspiro[indoline-2,3'-[3H]pyrido[3,2-f]-[1,4]benzoxazine], called QIso

DESCRIPTION OF THE PREFERRED EMBODIMENTS

In accordance to the present invention, the amount of UV light intensity present in sunlight is detected by using the propriety of a photochromic compound in changing its color upon exposure to ultraviolet light. The present invention will be explained below through the use of embodiments.

Embodiment 1

Figure 6:
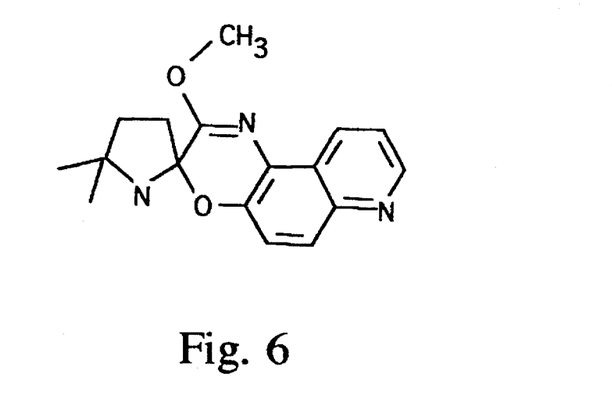
FIG. 6 shows the structure of Oxazilidinospirooxazine. This molecule exhibits an intense red color upon irradiation with UV.
Figure 7:
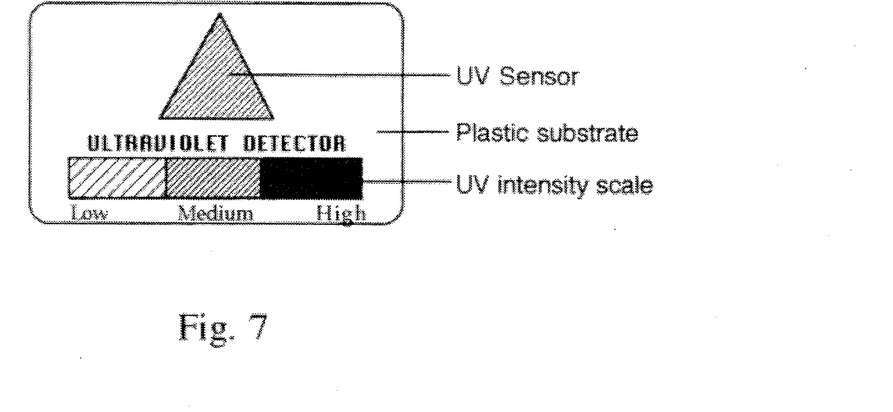
FIG. 7 shows the first embodiment of the ultraviolet detector. The photochromic composition is applied on a plastic card in a triangular shape. The UV intensity is scaled in a printed stripe as Low, Medium, High.

Oxazolidinospirooxazine (FIG. 6) is mixed with an acrylic coating or any adhesive for lamination such as cellulosics (e.g., cellulose acetate, cellulose acetate butyrate and cellulose acetate propionate), poly(vinyl butyral), poly-(vinyl chloride), poly(vinyl acetate) and polyurethanes, in the proportion of 5 to 10% in weight. The mixture thus obtained is applied to a plastic white card (FIG. 7). The card exhibits an intense red color upon exposure to UV. The same mixture can also be coated on a glass which darkens upon exposure to sunlight. The same coating can also be applied to a plastic colored sheet. The intensity of the visible color (red) is proportional to the intensity of the UV radiation present in sunlight. The experiment was performed in the middle of the month August at different times of the day at high altitude (1 mile high). The intensity of the color was the strongest when the sensor was exposed on a clear day between 11AM and 1PM. The intensity of total UVA and UVB, present at that time, is approximately $5mW/cm^2$. The sensor went back to its colorless form when it is removed from sunlight. Irradiating the sensor with indoor fluorescent light (no UV radiation) did not affect the sensor, i.e. no change of color was observed.

Embodiment 2

Figure 10:
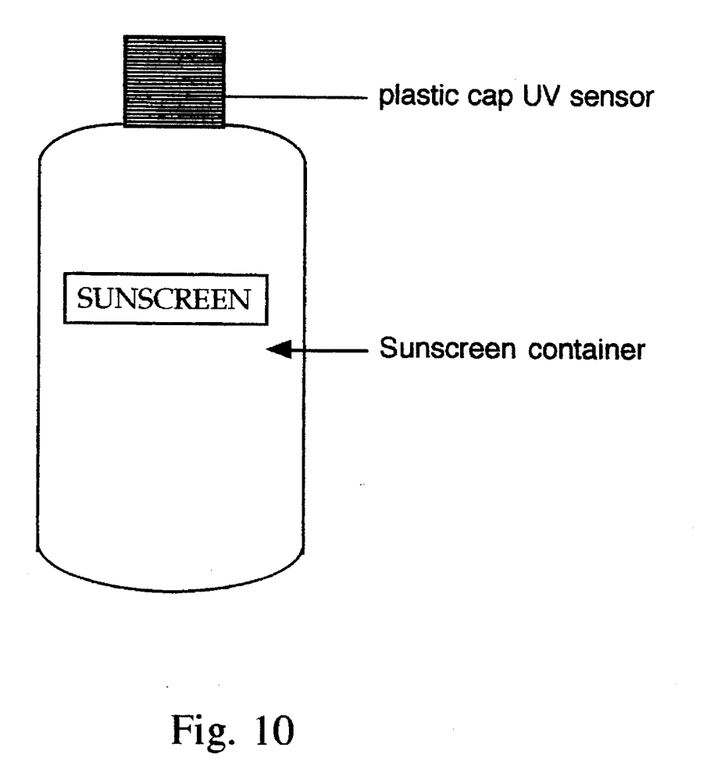
FIG. 10 shows a sunscreen bottle with a UV sensor cap.

Another process for applying a photochromic compound to a plastic is by injection molding. The photochrome can be mixed to the monomer in a proportion of 5 to 10% and then molded to form a polymer medium exhibiting a photochromic behavior. Examples of suitable plastics host material are optically clear plastics which include polyol(allyl carbonate)-monomers, polyacrylates, polyethylene, polypropylene, polyvinyl chloridepolymethyl methacrylates, cellulose acetate, cellulose triacetate, cellulose acetate propionate, cellulose acetate butyrate, Cellulose acetate propionate, polyacetal resin, acetyl cellulose, poly(vinyl acetate), poly-(vinyl alcohol), polyurethanes, polycarbonates, polysterene, poly(styrene methylmethacrylate) coopolymers, poly(styrene acrylonitrile) coopolymers, and polyvinylbutyral. The plastic is molded to form a cap of a bottle containing a sunscreen lotion (FIG. 10). Hence, providing an in situ way to check the effectiveness of the sunblock, for example, by applying a dab of the sunscreen lotion on the top of the cap. As long as the plastic cap does not change color, the sun lotion is still working. When the UV sensor turns red, blue, violet (depending on the spiroxazine used in the molding process) it is time to apply again the sunscreen. Moreover, the present UV sensor has the ability to check the effectiveness of any sunscreen over both UVA and UVB regions. This is of an importance since most of the sunscreens found on the market provide only UVB protection. As it has been stated earlier, due to the more important contribution of UVA rays in harmful effects of sun exposure, a total protection is needed.

Embodiment 3

Figure 8:
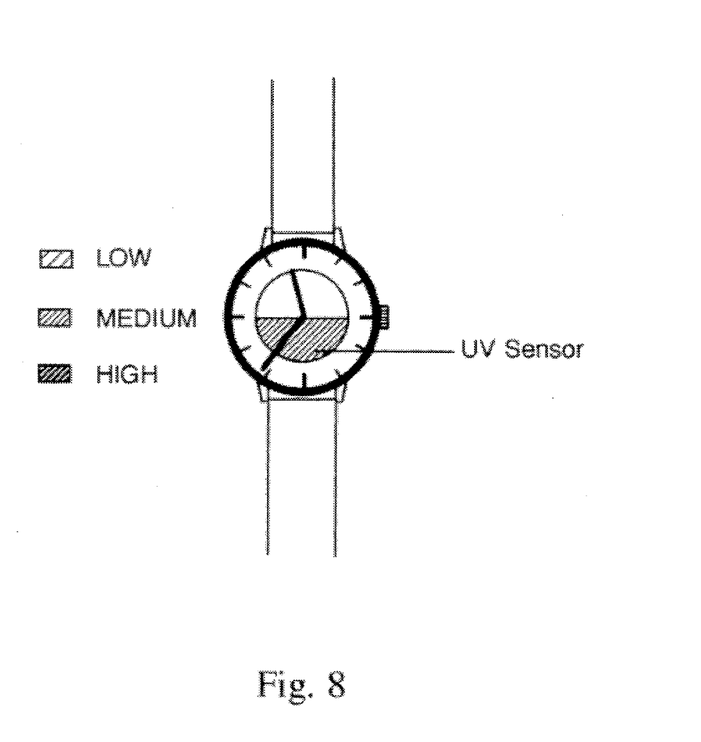
FIG. 8 shows the second embodiment of the ultraviolet detector: Watch containing the UV detector. The UV intensity is scaled as Low, Medium, High

The photochromic mixture is applied to the lower half of the inside sector of a watch as it is shown in the FIG. 8. On the other half of the sector, a scale Low, Medium, High is displayed to indicate the amount of UV radiation by variation of the color hue. Thus, the coloration of the sensor can easily be compared with the printed color scale.

Embodiment 4

Figure 9:
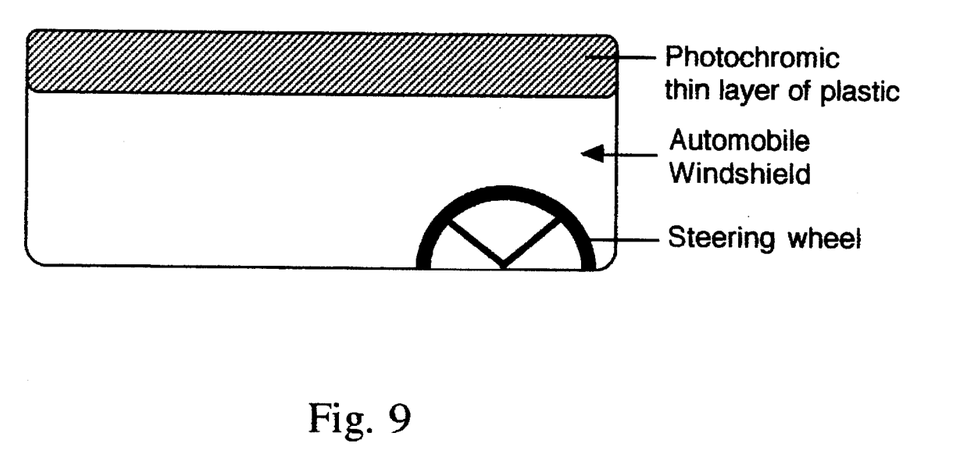
FIG. 9 shows the UV sensor applied on a windshield of an automobile. External view of windshield.

The photochromic compound can be incorporated in a transparent plastic sheet by a molding process described previously. The exposure of this thin layer of plastic to sunlight makes it darken. The transmission of UV light is decreased. Moreover, since this plastic layer exhibits a change of color (darkens), the visible part of the spectrum is also attenuated. It is therefore clear that this phenomenon can be used as a shading technique by coating the plastic layer on the upper part of an automobile windshield (FIG. 9). The intensity of sunlight reaching the driver is decreased, eliminating in this way the glare effect. The advantage of this technique over the usual tinted upper windshield is that, in the absence of sunlight (in a tunnel or at night) the full illumination is restored for the driver. In addition, instead of incorporating the photochromic compound directly into the glass of the windshield as it has been suggested in the invention of Knowles, U.S. Pat. No. 5238981, it is more judicious to incorporate the photochromic substance into a removable, disposable plastic sheet, since as it has been pointed out earlier, spiroxazines and spiropyrans have a limited lifetime.

I claim:

1. An Ultraviolet detector comprising:

a photochromic compound corresponding to a molecule in the spiroxazine or spiropyran group, wherein said photochromic compound is dissolved in a non-polar solvent and mixed to an acrylic coating or any adhesive for lamination to form a composition which is applied to plastic, paper, metal or glass, said photochromic compound is also dissolved in a non-polar solvent and mixed to a clear plastic and molded to form a material sensitive to UV radiation.

2. The ultraviolet detector of claim 1 is incorporated in a watch and a plastic card wherein the color change of said ultraviolet detector is compared to a printed colored scale, wherein said colored scale is a color hue variation.

3. The ultraviolet detector of claim 1 is molded as a cap of a sunscreen bottle to provide an in situ check of the sunscreen efficiency over both UVA and UVB ranges.

4. A variable sunshade for an automobile wherein the ultraviolet detector of claim 1 is used in a form of a removable thin plastic sheet to coat the upper part of a windshield of any automotive vehicle.

* * * * *